United States Patent [19]
Jackes

[11] 3,805,913
[45] Apr. 23, 1974

[54] AIR-CUSHION VEHICLE EDGE SKIRT ARRANGEMENT

[76] Inventor: Arthur M. Jackes, 11071 Arroyo Ave., Santa Ana, Calif. 92705

[22] Filed: Aug. 5, 1971

[21] Appl. No.: 169,325

[52] U.S. Cl............... 180/128, 180/124, 180/125, 180/120
[51] Int. Cl........................ B60v 1/02, B60v 1/16
[58] Field of Search ........... 180/116, 127, 128, 117, 180/118, 119, 120, 121, 122

[56] References Cited
UNITED STATES PATENTS

| | | | |
|---|---|---|---|
| 3,363,717 | 1/1968 | Hunt | 180/128 |
| 3,291,237 | 12/1966 | Hopkins et al. | 180/127 |
| 3,318,404 | 5/1967 | Hopkins et al. | 180/128 |
| 3,414,077 | 12/1968 | Earl | 180/128 |
| 3,258,080 | 6/1966 | Williams et al. | 180/127 |
| 3,478,836 | 11/1969 | Eckered et al. | 180/128 |
| 3,268,021 | 8/1966 | Jones et al. | 180/128 |
| 3,500,947 | 3/1970 | Cockerell | 180/116 |
| 3,643,758 | 2/1972 | Winter | 180/128 |
| 3,536,156 | 10/1970 | Crago | 180/128 |
| 3,536,154 | 10/1970 | Faure | 180/116 |
| 3,291,238 | 12/1966 | Eggington | 180/128 |
| 3,244,245 | 4/1966 | Page et al. | 180/128 |

FOREIGN PATENTS OR APPLICATIONS

| | | | |
|---|---|---|---|
| 1,203,025 | 8/1970 | Great Britain | 180/116 |
| 1,114,822 | 5/1968 | Great Britain | 180/128 |
| 1,028,045 | 5/1966 | Great Britain | 180/128 |

*Primary Examiner*—David Schonberg
*Assistant Examiner*—John P. Silverstrim
*Attorney, Agent, or Firm*—Gausewitz, Carr & Rothenberg

[57] ABSTRACT

An air-cushion vehicle lower-edge skirt arrangement including a flexible diaphragm attached at the edge of the hard structure of the vehicle and extending downwardly to an elongated member which may be substantially rigid and inclines to a lower portion beneath the hard structure, which portion may be horizontal for use at side edges or upwardly curved when at the rearward end of the vehicle, the elongated portion of the skirt being attached to the structure of the craft by diaphragms or by tie lines, the latter forming with the skirt the effect of a parallelogram, so that when the skirt moves its motion is stable and it may shift outwardly to avoid the hard structure of the craft upon extreme increments of movement. A flange or second skirt stage along the lower edge of the skirt, vent openings in the bottom of the skirt, or both, restrict the lateral side flow of air beneath the skirt. A member may be included at the top of the diaphragm to raise and lower it in controlling the attitude of the vehicle and optionally providing for side thrust or a damping effect. The diaphragm of the rearward skirt is controllable in dimension to raise and lower the skirt. Air passageways from the lift chamber may be included to inflate the skirt interiors, or the skirts may be inflated by an auxiliary blower to a pressure greater than that of the lift chamber. The vent openings may include slots that are inclined inwardly as well as downwardly, while horizontal portions of the skirts may be deflectable to increase the size of the slots. Also, there may be provided a generally horizontal panel extending across and from one end to the other of the lift chamber, the panel being pivotal about a transverse axis to vary the size of the opening to the space beneath it at the forward and rearward ends, thereby to control the amount and direction of thrust on the vehicle.

22 Claims, 20 Drawing Figures

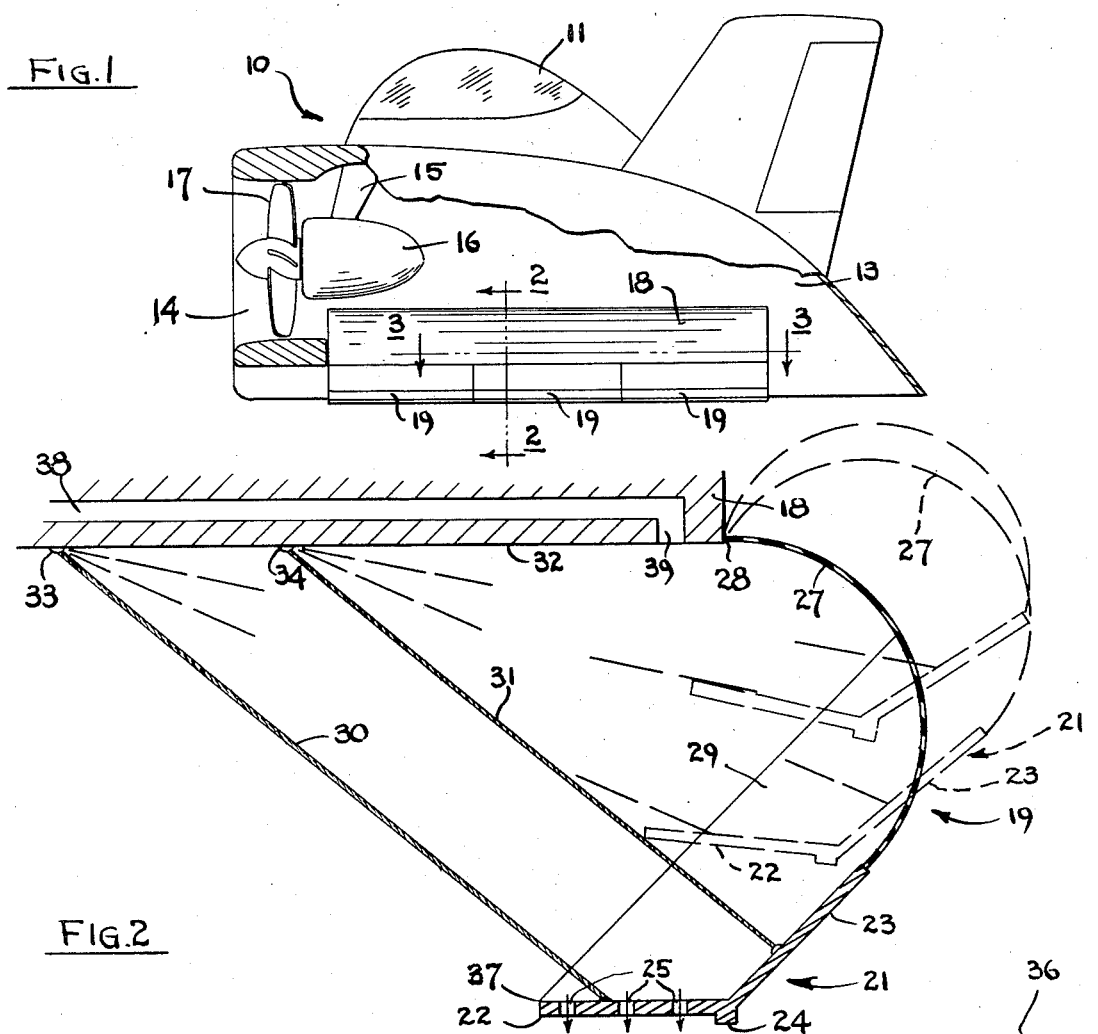
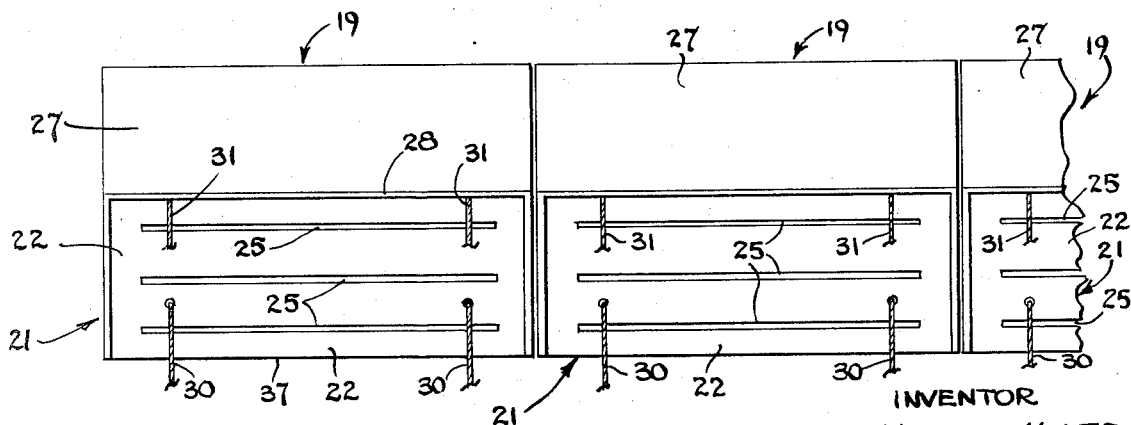

INVENTOR
ARTHUR M. JACKES
BY
ATTORNEYS

INVENTOR
ARTHUR M. JACKES
BY
ATTORNEYS

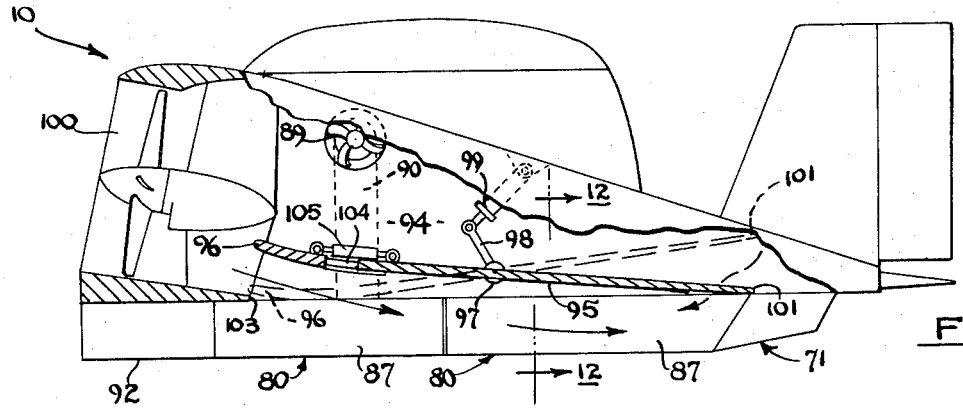
FIG. 11
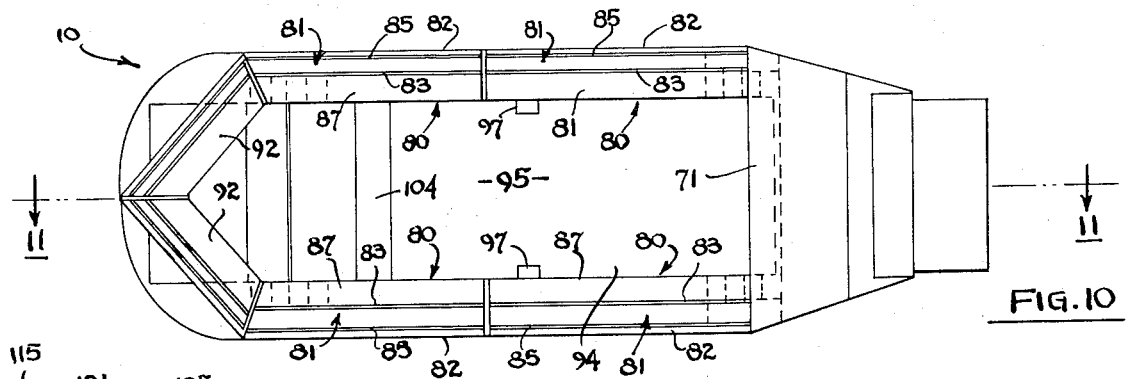
FIG. 10
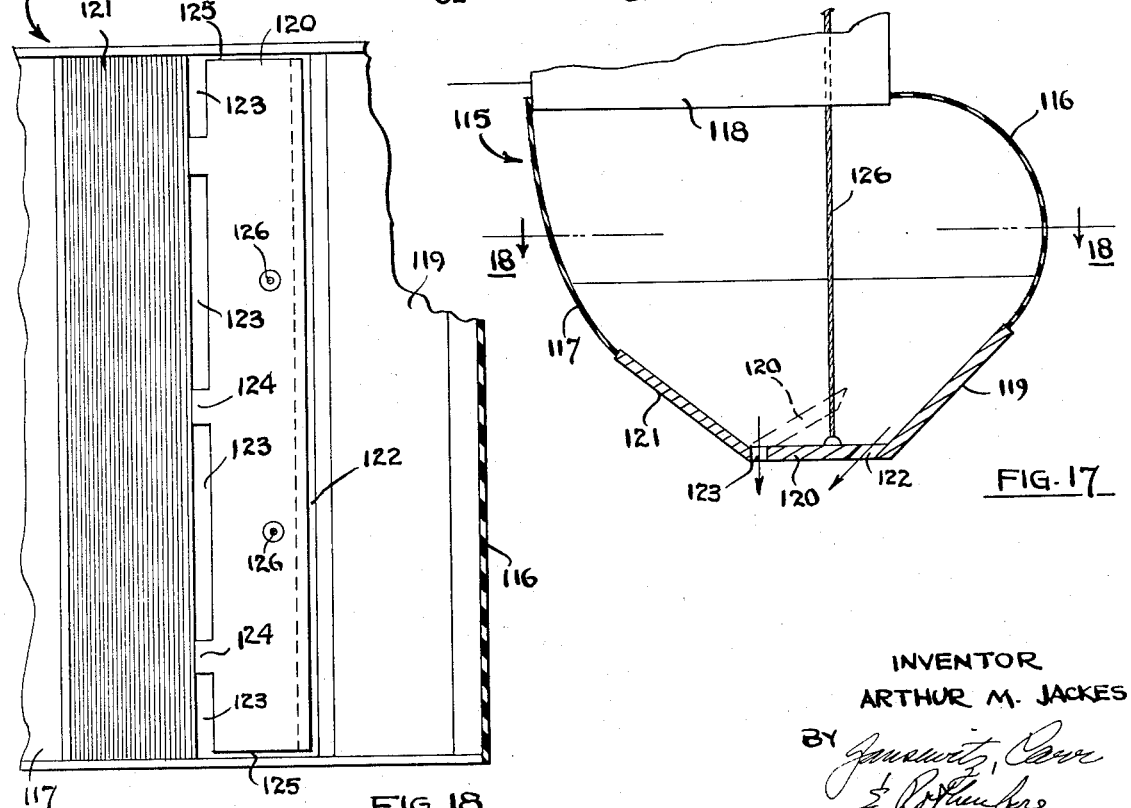
FIG. 17
FIG. 18
INVENTOR
ARTHUR M. JACKES

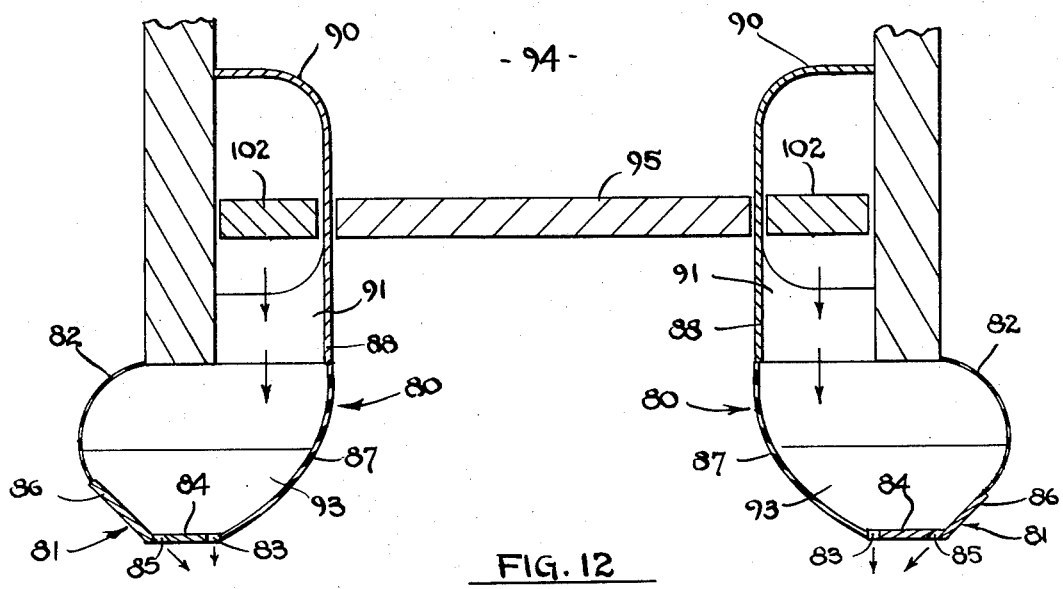
FIG. 12
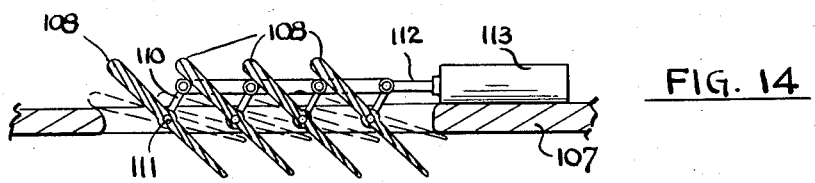
FIG. 14
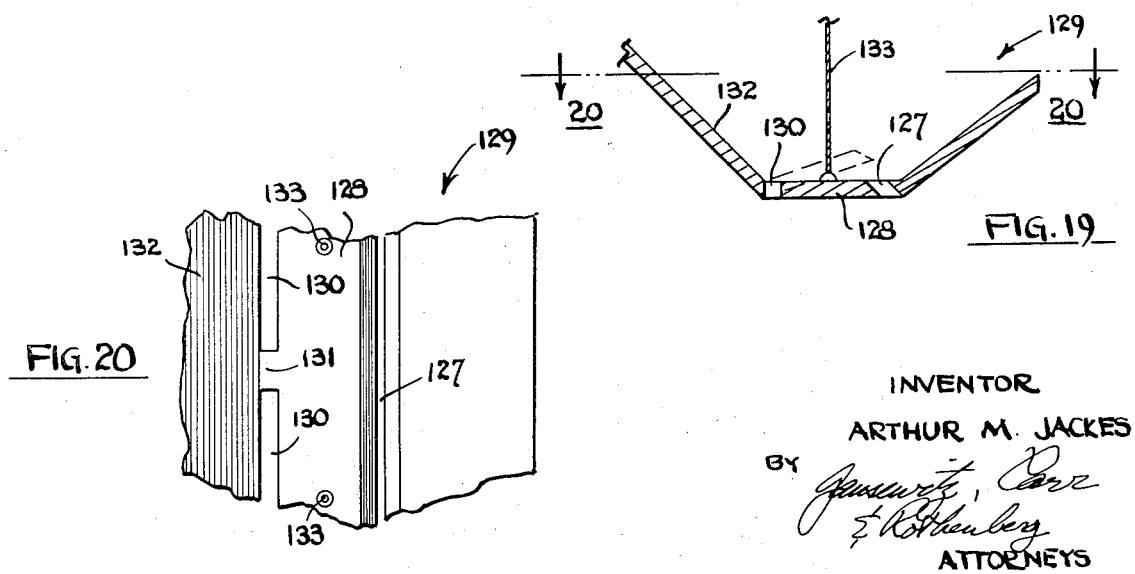
FIG. 19
FIG. 20
INVENTOR
ARTHUR M. JACKES
ATTORNEYS

AIR-CUSHION VEHICLE EDGE SKIRT ARRANGEMENT

BACKGROUND OF THE INVENTION

1. Field of the Invention

This invention pertains to a skirt for an air-cushion vehicle.

2. Description of Prior Art

In an air-cushion vehicle, its performance and efficiency are affected materially by the configuration of the lower edge portions of the vehicle around the lift chamber. This part of the vehicle is subject to contact with objects beneath it, which can result in substantial wear or damage to the elements at the lower edge of the craft as well as rubbing drag. Rigid structural members of greater durability do not provide an acceptable solution because of the obvious undesirable weight penalty, the fact that wear and damage cannot be entirely eliminated in this manner and that contact with objects beneath the craft actually can interfere with its progress. In U.S. Pat. No. 3,486,577, there are shown skirt devices for the edge portions of an air-cushion vehicle, which are rotatably mounted and intended to pivot out of the way when there is a pressure increase beneath them because of obstacles approached by the craft. However, in this instance and in others in the prior art, the edge portions of the vehicle have not combined all the needed features of light weight, simplicity and an ability to avoid obstructions by being sensitive to the approach of obstacles and automatically capable of large increments of movement to avoid contact. Also, the skirt device should present a smooth and streamlined surface to the flow of free air around the outside of the vehicle in order to reduce air drag due to the external air flow. Hence, it is preferred that the skirt be straight rather than convoluted along the sides. Efficient vehicle performance also requires minimum air loss from the lift chamber from lateral flow beneath the side edges. At the rear of the vehicle, where the discharging air creates a propulsive thrust, the outward airflow should be enhanced.

SUMMARY OF THE INVENTION

The present invention provides improved skirt arrangements for the lower side edges of air-cushion vehicles, which overcome the difficulties outlined above. The skirt includes a flexible diaphragm attached to the outer edge of the hard structure of the craft, with a substantially rigid but flexible member inclining downwardly from the diaphragm to a location within the lift chamber. The degree of rigidity, unless otherwise restrained as will be described, should be sufficient to withstand cushion pressure without substantial deflection, so that the edge will remain substantially straight and smooth rather than bowed or wavy between restraints. The rigid member should also be made of wear and abrasion resistant material. Tie lines extend inwardly to hold the skirt in equilibrium as it is pressurized with air from within the lift chamber. The substantially rigid lower portion of the skirt may include a horizontal section that connects to the inclined portion. The tie lines extend between the rigid member and the hard structure of the craft. When the horizontal section is used, the tie lines are arranged so that, together with their attachments, they define substantially a parallelogram. Alternative to the substantially rigid skirt member, an entirely flexible sheet may be used, with additional lines being included to confine it to the desired shape when it is under pressure, including a straight rather than bulging or wavy section along the side.

Normally, the horizontal section of the skirt experiences a pressure beneath it which is less than the pressure within the lift chamber but greater than ambient pressure. When an obstacle is encountered, the pressure beneath the rigid plate increases, causing the skirt to lift automatically over the obstruction. The parallelogram attachment of the tie lines results in a stable lifting motion for the skirt without substantial rotation. The tie lines are positioned and of a length sufficient to permit the skirt to rise upwardly and outwardly of the edge of the hard structure of the vehicle, so that an obstacle may be negotiated which is as high as the hard structure is above the skirt's normal position.

A flange depends from the lower edge of the skirt to constrict the flow of air from within the lift chamber so as to conserve it and to produce the desired pressure beneath the lower rigid element of the skirt. Alternatively, vents are provided through the skirt to result in downward air jets which likewise restrict the lateral flow of air. Both the flange or second skirt stage and the vents may be used if desired.

Several of the skirts may be mounted independently in end-to-end relationship so that they may move individually in negotiating obstructions. When the skirt is attached to a pivotal mounting plate at the upper end of the diaphragm, it may be controlled in its vertical position for use in raising or lowering the side of the vehicle. Also, the control plate may provide for a lateral air exhaust to produce a lateral thrust on the vehicle. Alternatively, when side thrust is not needed, the air may be confined by an auxiliary diaphragm that prevents the lateral airflow. The entrapped air can provide a damping effect to preclude rapid skirt position cycling due to pressure fluctuations.

Instead of tie lines, additional diaphragms may be used to connect the inner edges of the skirts to the craft, in which event the skirts are pressurized by an auxiliary blower or by openings connecting to the lift chamber. Also, inclined slots may be employed as the vents in the skirts, resulting in inwardly inclined air jets that efficiently confine the air in the lift chamber. When the air inflating the skirts is provided by an auxiliary blower, it may be at higher pressure than that of the lift chamber, increasing the effectiveness of the peripheral downward jet of air, so that the craft achieves the characteristics of an annular jet air-cushion vehicle. Unlike conventional designs, however, stability is achieved through the action of the skirts, eliminating the requirement for a center divider or jet for stability. When the air for inflating the skirts comes from the lift chamber, variable closure means, such as movable vanes, may be used for controlling the access to the skirts at either the forward or the rearward portion of the vehicle. This, in turn, enables the skirt pressurizing air to produce either forward or rearward thrust upon its discharge.

Thrust control is realized by controlling flow about a horizontal divider panel which is pivotal about a transverse axis and extends from one side to the other and substantially the full length of the lift chamber. In the neutral position, the panel is positioned so that access to the space beneath it is provided around both the leading and trailing edges equally, so that the thrust is essentially zero. When the front end of the panel is raised, the forward access to the space beneath it is increased, while the rearward access is decreased. Air introduced through the forward access accelerates and flows rearwardly to make up for the reduced flow from the rear access, and thus forward thrust is produced on the vehicle. The flow around this plate may be controlled by means of variable closures at the leading and trailing edges, or by variation of plate inclination. The length of the panel may also be variable for further controlling the amount of air which is to be allowed to flow beneath the panel. As subsequently described, the inclination of the divider panel helps to maintain uniform velocity in the flow of air under the panel, thus enhancing efficiency.

The skirt also may be provided with a deflectable horizontal portion which is used to increase the size of the downwardly and inwardly directed jet of air from within the skirts, thereby governing the amount of pressure experienced beneath the skirt. The pivotal horizontal portion may be rotatable about either its inner or its outer edge to achieve desired control functions.

An inflated controllable skirt for the rearward end of the chamber also is included, this member having an arcuate, substantially rigid portion at its lower edge, with flexible diaphragms extending from it to the structure of the craft. An air passageway from the plenum chamber inflates the interior of the rearward skirt. One end of the skirt is attached to a spool which can be rotated to raise and lower the skirt in controlling the thrust on the vehicle. The rearward skirt provides a smooth contour that offers low resistance to the flow of air which at that location is used to produce thrust for the vehicle.

BRIEF DESCRIPTION OF THE DRAWINGS

FIG. 1 is a longitudinal sectional view, partially in elevation, of an air-cushion vehicle utilizing the invention;

FIG. 2 is an enlarged sectional view taken along line 2—2 of FIG. 1;

FIG. 3 is a fragmentary sectional view taken along line 3—3 of FIG. 1;

FIG. 10 is a bottom plan view of a modified form of the invention;

FIG. 11 is a longitudinal sectional view taken along line 11—11 of FIG. 10;

FIG. 12 is an enlarged transverse sectional view taken along line 12—12 of FIG. 11;

FIG. 14 is an enlarged sectional view illustrating the vanes for opening and closing the forward opening to the skirts;

FIG. 17 is a transverse sectional view of a modified skirt having an independently movable horizontal portion;

FIG. 18 is a sectional view taken along line 18—18 of FIG. 17;

FIG. 19 is a fragmentary transverse sectional view of an arrangement similar to that of FIGS. 17 and 18, but with the horizontal portion hinged at the opposite side; and FIG. 20 is a sectional view taken along line 20—20 of FIG. 19.

DESCRIPTION OF THE PREFERRED EMBODIMENTS

Figure 5:
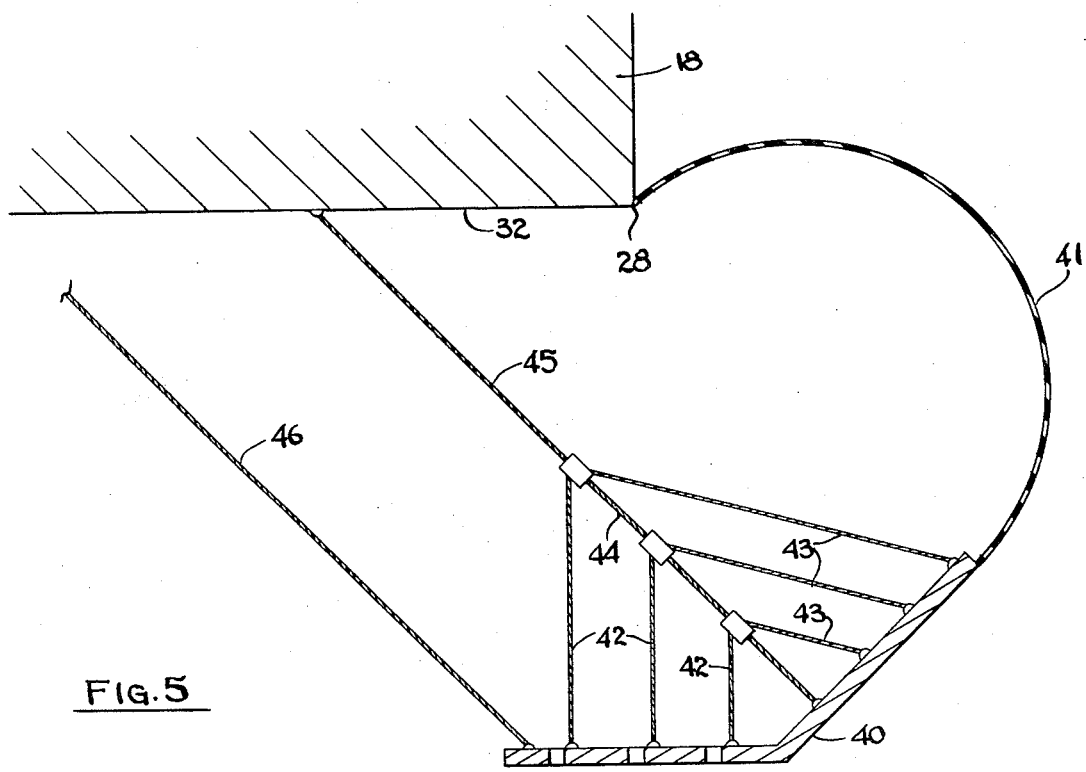
FIG. 5 is a view similar to FIG. 2 of a modified form of the invention in which all portions of the skirt are flexible.

This invention provides a skirt arrangement for use on virtually any type of air-cushion vehicle. As shown in FIG. 1, the invention is incorporated in a vehicle 10 of the general type illustrated in U.S. Pat. No. 3,486,577, which includes a suitable passenger compartment 11 mounted on a chamber 13 having an opening 14 in its forward end within which is a strut 15 that carries an engine 16 for operating a propeller 17. Air is drawn into the chamber 13 by the propeller 17, providing the cushion that supports the vehicle. Along the lower portion of either side of the vehicle 10, and extending longitudinally within the chamber 13, is a float 18 or other hard structure. Beneath the float 18 are skirt assemblies 19 that define the bottom edges of the chamber 13. In the embodiment illustrated, there are three of the skirt assemblies along either side of the vehicle 10.

Figure 4:
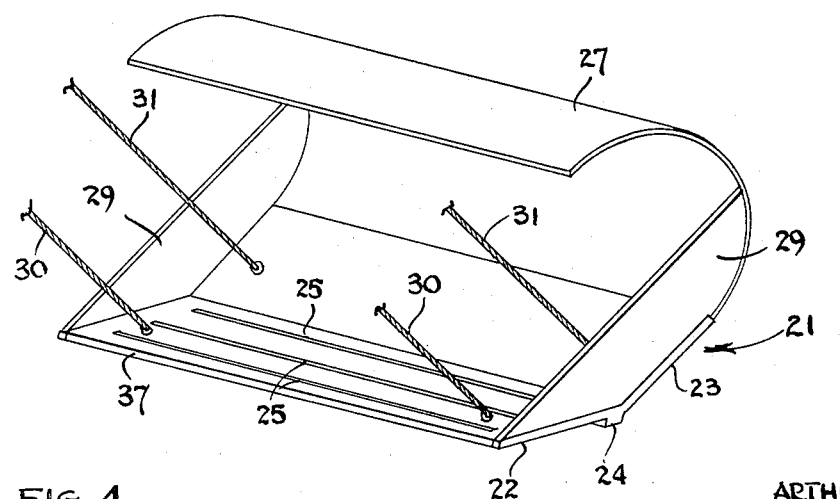
FIG. 4 is a perspective view of one of the skirt assemblies.

With reference to FIGS. 2, 3 and 4, each skirt assembly 19 includes a plate 21 of a rigid but yieldable material, such as a suitable plastic or rubber, that extends the length of the skirt assembly 19. The plate 21 includes a normally horizontal portion 22, which connects to an upwardly inclined portion 23 that is at an obtuse angle with respect to the section 22. The inner edge of the horizontal plate portion 22 is within the lift chamber 13, being underneath the float 18. A narrow downwardly projecting flange 24 is included at the juncture between the sections 22 and 23 of the plate 21. Also, there are slots 25 in the horizontal portion 22 of the plate 21, which extend longitudinally for substantially the full length of the plate 21.

Joined to the upper edge of the inclined portion 23 of the plate 21 is a flexible diaphragm 27 which connects at its upper edge to the lower outer corner 28 of the float 18. The diaphragm 27, which is impervious to the passage of air, extends the full length of the skirt assembly 19. At either end of the skirt assembly, connecting to the edges of the plate 21 and the diaphragm 27, are additional diaphragms 29. These serve as air barriers closing off the end portions of the skirt assembly 19 so that it defines a chamber which is open inwardly toward the lift chamber 13 of the vehicle 10.

Adjacent either end of the skirt assembly 19 or at appropriate points along the length of the skirt assembly are two cables or chords 30 and 31, which extend between the horizontal undersurface 32 of the float 18 and the plate 21. The line 30 connects at one end to the horizontal portion 22 of the plate 21 and at its other to a point 33 on the undersurface 32 of the float 18. The other line 31 connects to the inclined portion 23 of the plate 21 and extends to a point 34 on the undersurface 32 of the float 18, which is outwardly of the point 33. The connections are made so that the lines 30 and 31 are substantially parallel.

Instead of the tie lines 30 and 31, the end diaphragms 29 may be extended and attached to the surface 32 of the float 18 at one point. (Attachment at more than one point will tend to restrict free motion of the assembly.) In that event, the end diaphragms serve both to retain air and to attach the skirt to the vehicle.

When the vehicle is in operation, the air from within the chamber 13 has access to the skirt assemblies 19 through their open inner sides and pressurizes the interior of each skirt assembly. This causes the diaphragm to assume the arcuate configuration shown in FIGS. 2 and 4. The pressure from within the lift chamber exerts a downward and outward force on the plate 21, which is opposed by the lines 30 and 31 and the diaphragm 27. Lines 30 and 31 are in tension as shown, because the horizontal plate portion 22 extends into the lift chamber 13. The air pressure holds the plate 21 normally in equilibrium in the position shown in FIG. 2. Structural requirements are minimal for the lightweight skirt assembly 19. The plate elements 21 are continuous and have closely spaced supports to reduce the structural loads. The skirt assembly is supported from the vehicle by tension elements, and positioned by air pressure plus these restraints.

The skirt assemblies 19 are close to each other at their ends, so that there is virtually no leakage between them. The end diaphragms 29 are bulged outwardly from the air pressure from within the skirt assemblies 19, which helps seal the space between the adjacent skirt assemblies.

The depending flange 24 at the outer edge of the horizontal section 22 of the plate 21 restricts the flow of air from within the chamber 13 between the plate and the surface 36 beneath the craft. As a result, a pressure lower than that in the lift chamber 13, but greater than ambient pressure, is experienced on the bottom of the horizontal section 22 of the plate 21. The slots 25 in the plate section 22 have a similar effect. Jets of air flow downwardly from within the skirt through the slots 25, thereby providing a restriction in the passageway between the plate section 22 and the surface 36 beneath the vehicle. The restriction effected by these air jets likewise results in pressure greater than ambient in the space beneath the plate section 22. The pressure under plate section 22 rises or falls as the craft edge approaches or rises from the surface 36, creating forces and moments on the craft through the forces in the tie lines 30 and 31, thus tending to stabilize craft attitude and altitude.

When an object at a higher elevation than the surface 36 is approached, the space outwardly of or beneath the skirt assembly becomes correspondingly reduced. This, in turn, further restricts the lateral outward flow of air from the lift chamber 13. Consequently, as the flow velocity diminishes, the pressure beneath the horizontal plate section 22 is increased. This higher pressure causes the plate 21 to be lifted upwardly, thereby avoiding the object beneath it. The skirt assemblies 19 are not connected to each other, so they may move independently as obstacles are encountered, each automatically lifting upwardly to avoid contact.

When such lifting movement is imparted to the skirt assembly 19, the plate 21 moves in a stable manner by virtue of the nature of its attachment to the hard structure of the craft. The tie lines 30 and 31, together with the portion of the lateral surface 32 of the float 18 between the points 33 and 34, and the central portion of the plate 21, form an approximate parallelogram. As a result, the plate 21 moves upwardly and outwardly from the increased pressure beneath it, but experiences very little rotation. In other words, the bottom portion 22 of the plate 21 remains approximately parallel to the undersurface 32 of the float 18. Therefore, the skirt lifts in a controlled and stable manner.

When the vehicle passes over a large obstacle, the pressure beneath the plate section 22 becomes nearly equal to that within the lift chamber 13. The plate 21 then will move even further upwardly. The lengths of the tie lines 30 and 31 and their points of attachment to the float 18 are such that the plate 21 may move to the level of the float 18, clearing it to the outside. Thus, as shown in phantom in FIG. 2, when the plate 21 is elevated from a large pressure rise beneath it, the inner edge 37 of the lower plate section 22 is spaced just outside the bottom inside corner 28 of the float 18. Therefore, the skirt assembly 19 can pass over an object as high as the float 18 without damage, automatically shifting out of the way as the object is approached.

While the flexible portions of the skirt assembly 19 may tend to collapse toward the upper extreme position of the skirt, it will reinflate immediately and assume its normal position as the obstruction is passed. The inflation of the skirt assembly may be augmented by a passageway 38 which conducts air from the interior of the lift chamber 13 through the float 18 to an outlet opening 39 adjacent the upper end of the diaphragm 27. The air is directed downwardly adjacent the upper edge of the diaphragm 27 and will rapidly pressurize the interior of the skirt assembly 19.

With the slots 25 in the plate section 22 and the depending flange 24 being for the same purpose in restricting the lateral airflow, it may be possible to employ only one or the other in a given air-cushion vehicle in obtaining satisfactory results. By extending below the level of the skirt, the flange 24 occasionally may strike some objects beneath the craft, such as a narrow upwardly protruding element of a lateral dimension insufficient to result in the generation of sufficient pressure to lift the skirt assembly 19 an adequate distance to clear it. Consequently, there is some vulnerability to damage on the part of the flange 24, although it can at the same time offer a measure of protection to the plate 21. The slots 25, in providing a second path for the escape of air from the lift chamber, prevent extreme pressure fluctuations on the plate 21. As a result, the slots 25 have a damping effect on vertical oscillations from cyclic pressure forces on the plate 21. Downward jets along the side of the craft produced because of the slots 25 present a barrier that reduces the total air leakage from the lift chamber 13 and thereby increase efficiency of the vehicle. On the other hand, the strength of the plate 21 necessarily is reduced by the presence of the slots 25, so that, in some instances, the inclusion of such slots may be undesirable.

The lifting force on the skirt assembly 19 depends upon the product of the area of the horizontal plate section 22 extending inwardly of the edge 28 and the pressure difference existing between its top and bottom surfaces. It does not depend upon the momentum of the air escaping from the lift chamber. This means that the skirt design is suitable for low airflow cushion systems. It works well also in systems with higher airflow.

Similar results can be obtained from the embodiment shown in FIG. 5, in which the plate portion of the skirt is an entirely flexible section 40 beneath the diaphragm 41. In this instance, short parallel tie lines 42 on one side and 43 on the other connect from the flexible element 40 to an intermediate tie line 44. The outer main tie line 45 from the float 18 connects to the upper end of the intermediate tie line 44. The other principal tie line 46 extends from the float 18 to the inner portion of the flexible element 40. The air that inflates the skirt assembly of FIG. 5 creates internal pressures which are opposed by the lines 42, 43 and 44, as well as the principal tie lines 45 and 46. This enables the element 40 to retain substantially the same shape as the plate 21, while operating in a similar manner. A slot 47 in the lower horizontal portion of the element 40 provides the downward jet of air to serve the same purpose as the slots 25 in the previously described embodiment.

The version of FIG. 5 is very light in weight, possessing a low inertia which makes it particularly sensitive to pressure variations beneath it. The quick response of this embodiment of the skirt makes it especially desirable on highspeed craft.

Figure 6:
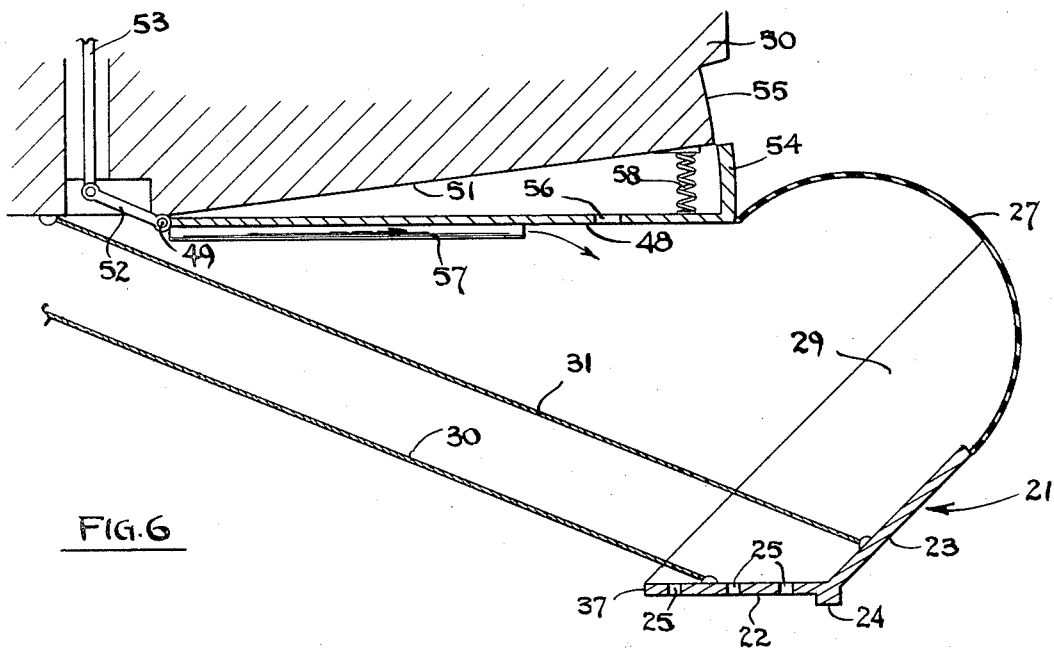
FIG. 6 is a sectional view showing a skirt which is controllable in position and produces a lateral side thrust when lowered.

In the arrangement of FIG. 6, the skirt assembly can be moved up and down in controlling the attitude of the vehicle. Moving a skirt assembly downwardly reduces the lateral airflow beneath it and so increases the pressure below the skirt. Therefore, if the skirts 19 are moved downwardly on one side of the vehicle, that side will be raised. Conversely, upward movement lowers the vehicle on the side where such movement has taken place.

In the construction of FIG. 6, there is an upper horizontal plate or equivalent structure 48 which by a longitudinal shaft 49 is pivotally connected to a float 50 that extends along the edge of an air-cushion vehicle. The undersurface 51 of the float 50 is inclined upwardly to its outer edge to accommodate movement of the plate 48. A crank arm 52 extends from the shaft 49 and is connected to a vertically movable rod 53. Therefore, movement of the rod 53 rotates the crank 52, which, in turn, pivots the plate 48.

There is an upwardly extending flange 54 at the outer edge of the plate 48, which can overlap a stepped-in surface 55 of the float when the plate 48 is pivoted upwardly. An opening 56 through the plate 48 provides communication with the space between the float 50 and the plate 48. The flange 54 is made to seal at the float surface 55, so that normally the air is retained between the float 50 and plate 48.

A skirt assembly 19 is carried beneath the plate 48, with the upper edge of the diaphragm 27 being connected to the plate 48 at its outer edge. A tube 57 may be included along the lower surface of the plate 48 to serve a purpose similar to that of the passageway 38 of the embodiment of FIG. 2 in effecting inflation of the skirt 19. In addition, a spring 58 is positioned between the upper surface of the plate 48 and the undersurface 51 of the float 50 to maintain the plate 48 normally in the horizontal position shown, which locates the skirt assembly 19 at its normal height. The force of the spring 58 is overcome readily when the skirt is to be lowered or raised.

When the plate 48 is pivoted downwardly in dropping the skirt 19, air may escape through the opening 56 to discharge laterally above the flange 54. The result is a side thrust on the vehicle. The control of the skirt assembly in raising the side of the vehicle, therefore, automatically generates a side thrust to effect lateral motion of the vehicle. Moving the plate 48 back to a raised position stops the lateral air discharge and terminates the side thrust.

Figure 7:
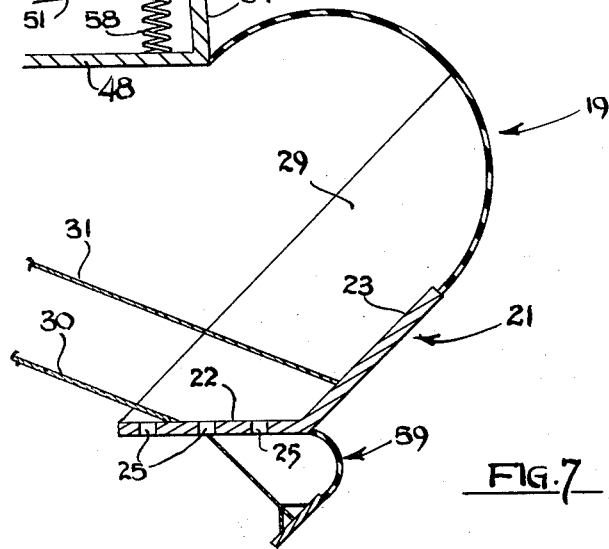
FIG. 7 is a view of a skirt similar to that of FIG. 6, but which prevents lateral side thrust.

While the production of a lateral force often is a desirable feature, it may be preferred to manipulate the skirt assemblies without producing the side thrust. In some cases, only a few of several controllable skirts need provide for the side thrust. The lateral air discharge may be eliminated by providing a diaphragm 60, as seen in FIG. 7, between the outer end of the horizontal plate 48 and the outer surface of the float 50. The diaphragm 60 provides a seal that will not allow air to discharge laterally even when the plate 48 is dropped downwardly a maximum distance. The diaphragm 60 is of sufficient width to permit the full range of downward movement of the plate 48. When the opening 56 is dimensioned to provide restricted access to the space between the plate 48 and the float 50, a dashpot effect can be realized to damp out fluctuations due to rapid pressure fluctuations on the skirt 19. The air in the space between the plate 48 and the float 50 is enclosed except for the opening 56, and will become compressed when the plate moves upwardly rapidly. The result is a damping of undesired oscillation of the skirt 19.

FIG. 7 also illustrates replacement of depending flange 24 by a second and smaller flexible skirt assembly 59. This smaller skirt assembly 59 may be generally similar to the previously described arrangements, or, as shown, it may be of a somewhat simpler type, described below in more detail with respect to FIG. 8. Thus, a two-stage skirt is obtained which may be used to increase skirt depth (or hard structure clearance of the surface) more than would otherwise be possible. The two-stage skirt may also serve to minimize air leakage, or to improve the ride quality. The first and second stage skirts will ordinarily have different dynamic characteristics due to differing length, size and weight, and even different air pressure. This can be used to advantage to change the natural frequency of the system, and to provide a superior suspension system. The second skirt may be used where the primary skirt is attached directly or otherwise to the hard structure of the craft, not being limited to a construction that includes the plate 48 as shown in FIG. 7.

Figure 8:
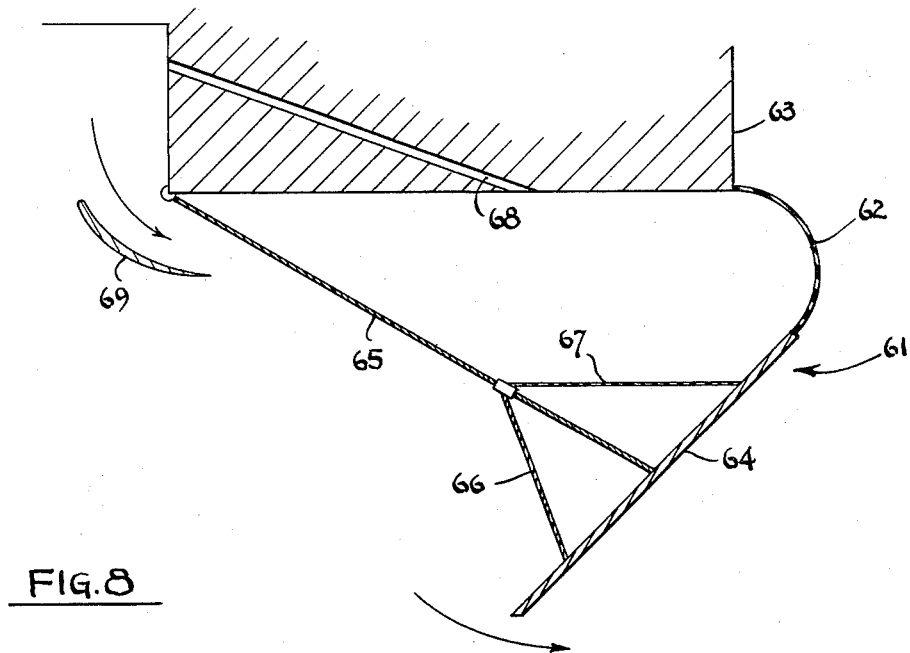
FIG. 8 is a sectional view of a simplified form of skirt.

In FIG. 8 there is illustrated a skirt 61 having an upper diaphragm 62 attached to the outer corner of the rigid float or other hard structure 63 of the craft, while a plate 64 of generally rigid material inclines downwardly from the end of the diaphragm 62. The lower end of the plate 64 is beneath the float 63, so that the skirt 61 is subjected to downward pressure from the lift chamber. A tie line 65 with auxiliary lines 66 and 67 connect the plate 64 with inner portions of the float 63. The skirt assembly is inflated generally as in the previously described embodiment. However, by eliminating the bottom horizontal portion of the rigid plate found in the embodiment of FIG. 2, it becomes relatively insensitive to irregularities beneath it and lacks much of the self-lifting characteristic of the previously described designs. However, it is a simple construction and operates well over smooth surfaces. In this arrangement, there is shown an air passsage 68 through the hard structure 63 to introduce air into the skirt assembly 61 in the event that it should become collapsed from contact with an object below.

A vane 69 may be included, if desired, at the inner edge of the hard structure 63, this vane extending longitudinally and being inclined outwardly and downwardly toward the skirt assembly 61. The vane 69, therefore, directs air from the interior of the lift chamber into the skirt assembly. When the vane is included, the skirt assembly has some ability to lift when obstacles are encountered because proximity to the surface modifies the normal distribution of pressure on the skirt 61.

Figure 9:
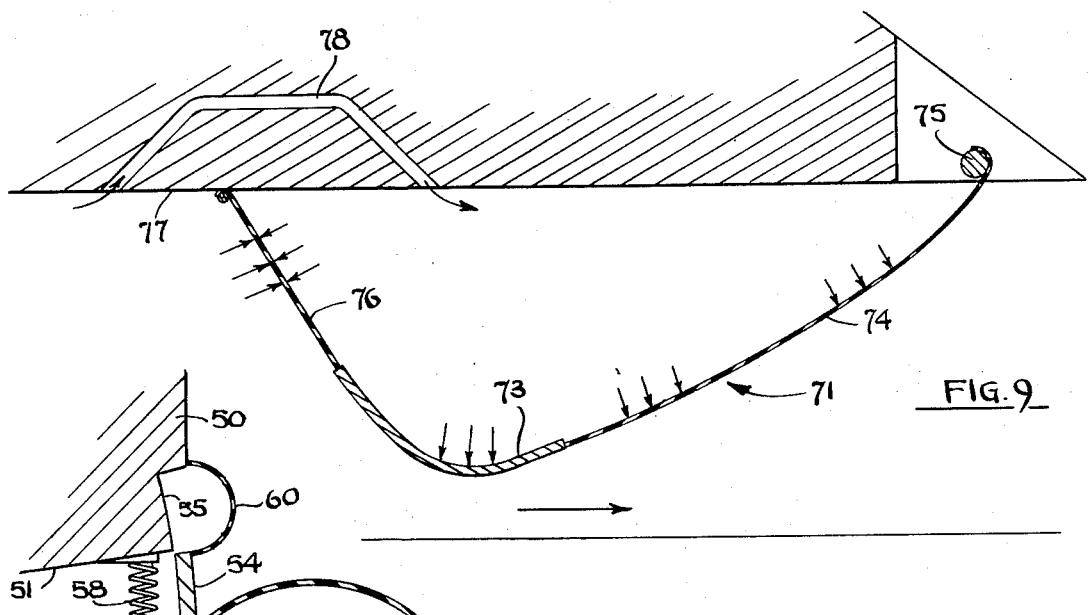
FIG. 9 is an enlarged sectional view of the skirt at the rearward end of the vehicle.

The skirt 71 shown in FIG. 9 is positioned at the rearward end of the lift chamber 13 of the vehicle 10. Air exhausting to the rear beneath the skirt 71 provides forward thrust for the vehicle 10, so that it is desirable to have a smooth contour at this location, which will minimize resistance to the flow of the air. This is accomplished by the skirt 71, which is rounded at its lower portion and inclines upwardly at a gradual angle toward the rear.

The central portion 73 of the skirt 71 is of a rigid but yieldable material, such as that used for the plate 21 in the embodiment of FIGS. 1–4. The member 73 extends for the full length of the skirt 71 and is curved in one plane so as to form a shallow channel in cross section, the convex side of which faces downwardly. The rearward portion 74 of the skirt 71 is a flexible membrane which is impervious to the flow of air. One edge of this membrane connects to and extends the length of the substantially rigid element 73, while the opposite end connects to a spool 75 rotatably mounted at the rearward end of the vehicle 10. Rotation of the spool 75 varies the width of the diaphragm 74 in either raising or lowering the skirt 71.

The forward part 76 of the skirt 71 may be a flexible diaphragm that inclines upwardly and forwardly to the hard structure 77 at the rearward end of the lift chamber 13. Suitable cables or cords attached to the forward end of the element 73 also may be used, but a solid diaphragm will preclude scooping water or debris into the interior of the skirt 71. Also, the forward portion 76 may be a rigid member which is attached by a hinge or flexible fastening to the hard structure 77 of the craft, and by a similar connection to the forward edge of the portion 73 of the skirt 71.

A passageway 78 is provided through the hard structure of the craft into the interior of the skirt 71. This provides communication between the lift chamber 13 and the interior of the skirt 71. As a result, the skirt 71 is inflated substantially to the same pressure that exists within the lift chamber, which causes the skirt to assume the configuration shown in FIG. 9. When tie lines are used to attach the forward end of the member 73 to the vehicle, the passageway 78 is unnecessary.

The arcuate configuration of the rigid but yieldable central portion 73 of the skirt 71 minimizes the deflection of the membranes 74 and 76 by the pressure of air within the skirt 71 by increasing the tension in these members so that they assume a relatively low curvature. This provides the equivalent of an efficiently contoured nozzle at the rearward end of the lift chamber. By raising or lowering the skirt 71 through the operation of the spool 75, the area of the air discharge path is controlled. This, in turn, controls the thrust on the vehicle 10. Obviously, when the skirt 71 is elevated, the thrust is increased, while the skirt also may be lowered sufficiently to eliminate forward thrust due to this nozzle action.

The skirt 80 shown in FIGS. 10–12 includes a plate of substantially rigid but yieldable material and an outer flexible diaphragm 82 similar to the corresponding components of the skirt previously described. An inner longitudinal slot 83 extends through the plate 81 at the inner edge of the horizontal portion 84 of the plate. The parallel outer slot 85 is positioned at the line of connection between the horizontal portion 84 and the outer sloping portion 86 of the plate 81. The outer slot 85 is inclined inwardly at the angle of the sloping portion 86 of the plate 81. This means that air discharged through the outer slot 85 is directed both downwardly and inwardly toward the lift chamber. The result is an enhanced sealing effect at the perimeter of the lift chamber to more effectively retain air within the lift chamber.

A diaphragm 87 extends from the inner edge of the horizontal portion 84 of the plate 81 to the corner of the hard structure 88 at the edge of the craft. This diaphragm retains the skirt, replacing the tie lines previously described. Air for inflating the skirt 80 is supplied by an auxiliary power-driven blower 89 mounted at any convenient place on the vehicle and connected by a duct 90 to an opening 91 through the hard structure 88, discharging into the interior of the skirt 80 adjacent the diaphragms and the plate. The air thus supplied may be at a greater pressure than that existing within the lift chamber. This accounts for the curvature of the diaphragm 87, as shown in FIG. 12, with a convex surface being presented adjacent the lift chamber.

In the embodiment shown in FIGS. 10–12, there are two of the skirts 80 on either side of the vehicle, collectively extending substantially the full length of the vehicle. Similar skirts 92 are arranged to a V-shaped pattern at the bow of the craft. The skirts 80 and 92 may be provided with end diaphragms 93 to help retain air as the skirts move individually, but which do not extend the full height of the skirt, so that there is communication from one skirt to the other. This allows the pressurized air from the blower 89 or other source to supply the various skirts.

At the rear of the vehicle, the skirt 71 of FIG. 9 is used again, allowing air to escape in the rearward direction. This is desirable because the rearwardly discharging air provides thrust for the vehicle.

With the skirts 80 and 92 being supplied with air at a pressure higher than that in the lift chamber 94, the front and side flow is characteristic of an annular jet air-cushion vehicle. The resulting combination of plenum and annular jet has, as a result, a lower total airflow than the previously described embodiments. The energy of the side and front airflow cannot be completely recovered in the form of propulsive work. Therefore, it is usually advantageous to reduce this airflow, which may permit a higher surface clearance to be realized than otherwise would be possible. Substantially all of the energy of the rear flow can be recovered as propulsive work, and thus it is usually desired to maintain a high volume of air flowing past the rear edge of the lift chamber. The flat surface of the horizontal plate 84 is sensitive to surface proximity and so stabilizes the craft in a level attitude. Thus, if one side of the craft should drop, the pressure will increase beneath the horizontal plate portion 84 on that side, automatically righting the craft. Conversely, if one side should rise, the pressure beneath the horizontal plate surface 84 decreases, allowing that side to drop. As a result of this self-leveling effect, there is no necessity for a jet or an additional skirt at the centerline of the craft for stabilization, which is a significant advantage over conventional annular jet air-cushion vehicles. The present design, therefore, has the characteristics of automatic stabilization of attitude, an efficient sealing of air within the lift chamber and a much larger internal airflow than in previous designs of annular jet air-cushion vehicles, which is used in flow past the rear edge for propulsion as well as lift.

The skirt 80 shown in FIGS. 10-12 may be mounted on a hinged movable structure, such as shown in FIG. 6, to permit the skirt to be deflected downwardly to control the vehicle attitude. Air may be permitted to escape to the side of the craft upon this deflection, or there may be an additional air pocket for damping oscillations, such as the type shown in FIG. 7. Variations also are possible in the design of the craft, which does not necessarily have to have a forward air inlet for the lift chamber, but which may draw air in vertically instead. External propulsion means by propeller or jet may be used if desired.

A horizontal force vector control system also is provided, which includes a generally horizontal divider panel 95 extending across the lift chamber from one side to the other, and also divider panels 102 extending across the ducts 90 which feed the annular jet side skirts 80. The action of divider panels 102 and 95 is similar in controlling both the direction and velocity of their respective flows. In the following, for simplicity, the action of the panel 95 only will be described, but this should describe equally the action of plates 102. The panel 95 extends for substantially the full length of the lift chamber, and is positioned below the upper wall of the lift chamber, just above the skirts 80. The panel 95 is substantially flat, but has a slight upward curvature at the forward end portion 96. The divider panel 95 is mounted on journals 97 so that it is pivotal about a horizontal axis transverse to the vehicle. In the example shown, there is a crank arm 98 extending from the panel 95 and movable by a power cylinder 99 to accomplish rotation of the panel.

The divider panel 95 provides a means for controlling the thrust of the main body of air in the lift chamber which escapes past the rear skirt 71. When the forward end 96 of the panel 95 is pivoted upwardly, as shown in FIG. 11, the effect is to increase the size of the opening at the forward portion of the vehicle between the air inlet 100 and the space beneath the panel 95, and to reduce the size of the opening between the trailing edge 101 of the panel 95 and the top edge of the transverse rear skirt 71. The result is that more air passes under panel 95 at the front than at the rear. This air is accelerated in a rearward direction to replace the air formerly entering at the rear. The result is an increase in forward thrust.

However, if the forward end 96 of the divider panel 95 is pivoted downwardly, as shown in phantom lines in FIG. 11, the trailing edge 101 becomes spaced upwardly from the top edge of the rear skirt 71. At the same time, the forward end of the divider panel 95 is moved into adjacency with the transverse bottom edge 103 of the air inlet passageway 100. This prevents air from flowing beneath the horizontal divider panel 95 from the forward end. There is, however, an air path at the rear past the trailing edge 101. That air flows forwardly because it must replace the air formerly introduced from the forward end. Thus, a forward velocity is imparted to the air, resulting in a reverse thrust on the vehicle. As a result, the panel 95 permits the vehicle to be moved backward as well as forward. Of course, the panel 95 may be positioned intermediate these extremes to suit particular conditions.

Thrust is increased by lowering the trailing edge of divider panel 95. As this change occurs, the desired uniform pressure may be maintained by moving the forward end portion 96 of the panel 95, which is separate, being carried on a telescoping mount 104 and engaged by a power cylinder 105. This permits the forward end portion 96 of the panel to be retracted rearwardly as the power cylinder 105 is retracted. As a result, the area of the effective opening to the space beneath the panel 95 is made larger, raising the pressure at the front of the craft. Because the divider panel 95 is inclined downwardly at the rear when forward thrust is being produced, a uniform pressure is realized throughout the length of the lift chamber. A small amount of air escapes to the sides as the air flows rearwardly toward the rear skirt 71. With the divider panel 95 being inclined downwardly toward the rear, the area beneath it progressively becomes smaller. As a result, even though the quantity of air is reduced by the amount that escapes to the sides, the velocity of the air can be maintained constant, and a constant pressure is realized.

By proper selection of both plate angle and the position of the front end portion, the pressure may be maintained constant while the general direction of the flow is varied from neutral to rearwardly for increased thrust. Similarly, the pressure may be maintained constant and uniform while the air is given a net forward direction so as to produce reverse thrust.

Also, the divider panel 95 should be inclined by at least the maximum probable pitch angle which could be experienced by the craft to avoid a destabilizing pressure on the divider panel. For example, if the vehicle is in a nose down condition, the divider panel 95 should be at least in the horizontal position so that forces generated on the panel will not push the nose further downwardly.

Figure 13:
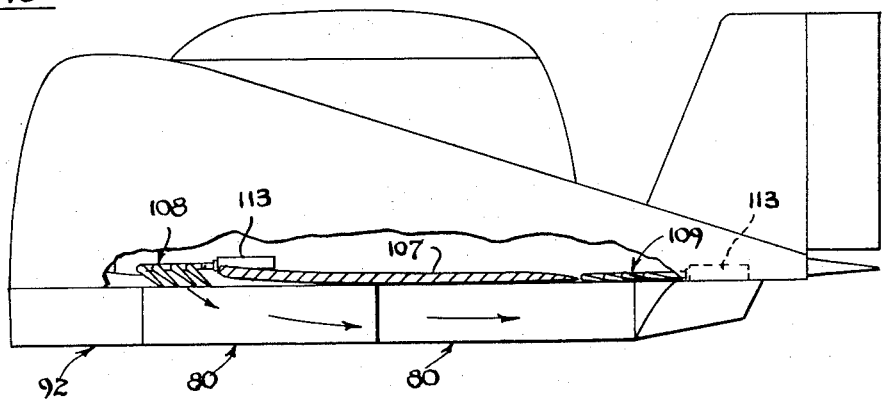
FIG. 13 is a side elevational view, partially broken away, illustrating a further modification of the means for pressurizing the skirts.

Another form of the force vector control system is shown in FIGS. 13 and 14. In this arrangement, used in lieu of the annular jet skirt system of FIGS. 10-12 that relies upon an auxiliary blower 89, air flows into the side skirts from the lift chamber. This flow may be controlled by the arrangement shown. The hard structure 107 shown in FIGS. 13 and 14 is similar to the plate 95 previously described, except that it is fixed in position. It does not extend for the full length of the side of the vehicle. Forwardly of the structure 107 is a set of parallel vanes 108, while a similar set of vanes 109 is positioned rearwardly of the structure 107. The vanes 108 and 109 are pivotal so that they can selectively close off or open up the spaces at the forward and rearward ends of the structure 107. Any suitable means may be provided for rotating the vanes 108 and 109, such as the arrangement shown in FIG. 14 for the vanes 108. In this construction, there are crank arms 110 connected to the mounting shafts 111 of the vanes 108. The outer ends of the crank arms 110 are connected to a rod 112 that extends to a power cylinder 113 carried by the structure 107. Extension of the power cylinder 113 from the position shown in FIG. 11 will rotate the crank arms 110 in the counterclockwise direction as illustrated, thereby rotating the vanes 108 in the same direction to close the opening at the forward end of the structure 107.

When the front vanes 108 are open and the rearward vanes 109 are closed, air will enter at the front portion of the forward skirt 80, discharging at the rearward end of the rearward skirt along the side of the vehicle. This air has a significant velocity through the side skirts so that, as it escapes to the rear, it produces a forward thrust component on the vehicle. This conserves the energy of the air brought into the lift chamber and contributes to the propulsive effect on the craft. This air offsets both the external drag and also the ram drag due to capturing air in the lift chamber at the velocity of the vehicle. Of course, when rearward thrust is to be obtained, the vanes are reversed, with the forward vanes 108 being closed and the rearward vanes 109 opened.

Figure 15:
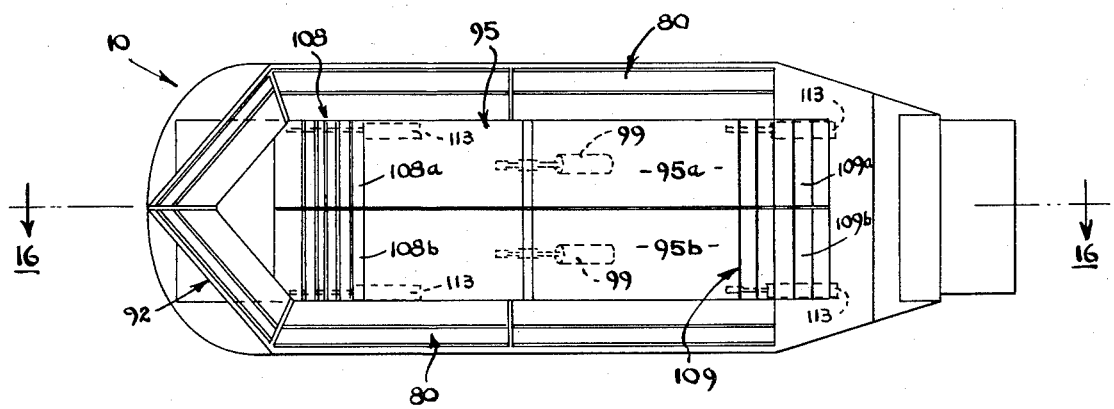
FIG. 15 is a bottom plan view of a different embodiment including an arrangement for controlling roll attitude and side force.
Figure 16:
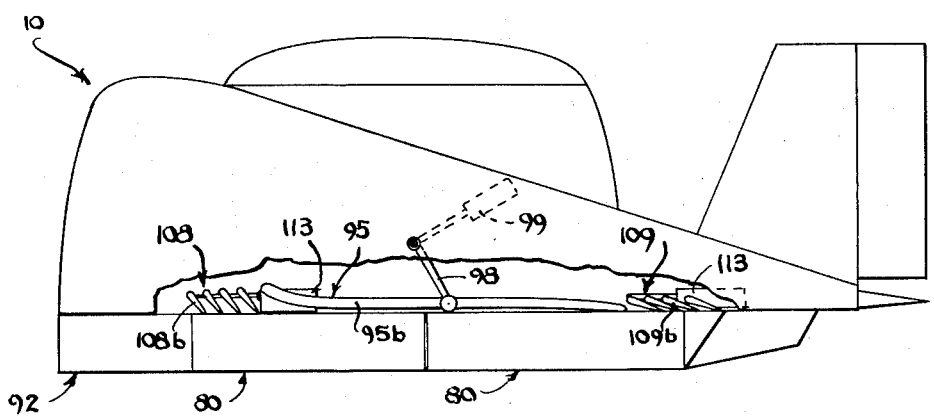
FIG. 16 is a longitudinal sectional view taken along line 16—16 of FIG. 15.

The vanes 108 and 109 may be extended inwardly of the side edges of the craft so as to encompass the full width of the lift propulsion chamber, as shown in FIGS. 15 and 16. In this arrangement, the vanes 108 and 109 are located forwardly of the leading edge 96 and rearwardly of the trailing edge 101 of the panel 95. Operation of the vanes 108 and 109 controls the flow of air around the leading and trailing edges 96 and 101, respectively. The pivotal mounting of the panel 95 is maintained for trim control and to permit achieving efficient thrust. The upward inclination of the leading edge 96 helps provide an efficient acceleration of the air as it enters the lift and thrust chamber.

In this example, the panel 95 is made in two sections 95a and 95b, separated along the longitudinal centerline of the craft. The vanes 108 and 109 similarly are in two parts 108a and 108b and 109a and 109b, respectively, divided at this location. The opposite parts of the vanes and the panel 95 may be operated separately and differentially to control the roll attitude and also the horizontal side force. A power cylinder 99 is included for each of the sections 95a and 95b of the panel 95. Also, there is a power cylinder 113 for each section of the vanes 108 and of the vanes 109. With this kind of control, more air is discharged on the high side than on the low side, but also the larger mass of air is discharged at a higher side angle and a higher velocity than the air on the low side. Thus, the side force due to roll is augmented.

Another control arrangement is shown in FIGS. 17 and 18, in which the jet of air at the periphery of the craft may be varied. The skirt 115 shown in these views is generally similar to the skirt 80 previously described, including an outer diaphragm 116 along the edge of the craft and an inner diaphragm 117 that connects to the hard structure 118. The plate portion of the skirt includes an inclined outer part 119 and a horizontal section 120. Unlike the skirt 80, the skirt 115 includes an inner portion 121 that inclines inwardly and upwardly from the inner edge of the horizontal plate portion 120. A slot 122 is included between the horizontal portion 120 and the outer inclined portion 119. This provides for the outer jet of air inwardly and downwardly along the periphery of the craft.

At the inner part of the horizontal portion 120 are intermittent slots 123 which leave narrow sections 124 of the material of the plate portion of the skirt, interconnecting the inner inclined part 121 and the horizontal portion 120. The inner vertical jet of air exhausts through the slots 123. The horizontal portion of the skirt is unconnected to the remainder of the skirt at its ends 125. Tie lines 126 are connected to the horizontal skirt section 120 and provide support for this section of the skirt.

When the tie lines 126 are pulled upwardly, the narrow connecting strips 124 will bend, allowing the section 120 of the skirt to be pivoted upwardly as if it were hinged along its inner longitudinal edge. This increases the width of the outer jet slot 122, thereby allowing the discharge of a greater quantity of air at the outer jet along the side of the vehicle. The result is a greater lift beneath the skirt 115. This increase in lift occurs because the augmented peripheral jet provides an even greater barrier to the lateral outward flow of air from the lift chamber than that of the normal narrower jet of downwardly and inwardly flowing air. With the increased barrier to outward flow, the lateral velocity of the air beneath the skirt 115 is reduced and the pressure is increased.

The skirt sections 120 may be controlled individually to produce roll control for the craft. This is accomplished without requiring as much deflection of the entire skirt as would be required where the skirt assembly as a whole is deflected as described above. This arrangement also can enhance the automatic pressure increase beneath the skirt as it approaches the surface beneath it to assist in shifting the skirt upwardly to avoid contact. As the pressure beneath the section 120 becomes greater when the surface beneath the craft is approached, the added upward force will result in a pivoting of the section 120 as the narrow connecting strips 124 are bent. Automatically, therefore, the outer peripheral jet will become larger to cause an increase of the pressure beneath the skirt.

The same principles may be applied in a different manner by the construction shown in FIGS. 19 and 20, where the horizontal portion of the skirt is hinged at its opposite side. Thus, as shown in this illustration, there is an open slot 127 along the inner edge of the horizontal portion 128 of the skirt 129. At the outer edge of the horizontal portion 128, there is a slot 130 that is interrupted by narrow strips 131 interconnecting the horizontal portion 128 with the outer inclined part 132 of the skirt. In this arrangement, the outer slot 130 is vertical, while the inner slot 127 is inwardly inclined.

The operation of the skirt 129 is opposite from that of the skirt 15. Thus, when the portion 128 of the skirt 129 is lifted by the tie lines 133, the inner peripheral jet is increased, providing a greater barrier to the outer flow of air from the lift chamber before it reaches the intermediate portion of the skirt. This blocks the higher pressure lift chamber air from the intermediate portion of the skirt so that the pressure beneath the skirt is reduced. When there is sufficient clearance beneath the craft to assure that the skirt will not contact the surface beneath it, this may be used in cushioning the effect of passing over an uneven surface. It is possible to incorporate both skirts 115 and 129 in the same vehicle, preferably arranged alternately so that they may be operated selectively to achieve desired effects.

The foregoing detailed description is to be clearly understood as given by way of illustration and example only, the spirit and scope of this invention being limited solely by the appended claims.

I claim:

1. In combination with an air-cushion vehicle having a a lift chamber, means for providing pressurized air in said lift chamber, and a generally rigid structure having a lateral surface extending along an edge of said lift chamber, a skirt arrangement for said lift chamber comprising a flexible diaphragm disposed longitudinally of said edge so as to present one side of said diaphragm adjacent said lift chamber, one longitudinal edge of said diaphragm being attached to said vehicle adjacent said edge of said lift chamber, a plate means, said plate means including an edge connected to the lower edge of said diaphragm, a first portion inclined downwardly and inwardly from said edge thereof, and a second generally horizontal portion connected to said first portion at an obtuse angle relative thereto, for being reacted upon by pressures above and below said second portion for moving said skirt arrangement upwardly and downwardly, said second portion being beneath said lateral surface, means for applying pressurized air to the upper surface of said plate means and to said side of said flexible diaphragm, and means interconnecting said plate means and said vehicle, said means interconnecting said plate means and said vehicle including a duality of flexible members, a first end of each of said flexible members being connected to said lateral surface, said first ends being at spaced locations, the opposite second end of each of said flexible members being connected to said plate means, said second ends being at spaced locations, said flexible members together with the portions of said lateral surface and said plate means therebetween defining approximately a parallelogram, for thereby allowing said plate means to move outwardly and upwardly in a stable manner relative to said lateral surface.

2. A device as recited in claim 1 in which said connections of said first ends of said flexible members are such that said first end of one of said flexible members is laterally outwardly relative to said lift chamber with respect to said first end of the other of said flexible members, said second end of said one flexible member being connected to said first inclined portion of said plate means, said second end of said other flexible member being connected to said second generally horizontal portion of said plate means.

3. A device as recited in claim 1 in which said flexible members are of an adequate length and connected to said lateral surface at positions such that said plate means can move upwardly to the level of said lateral surface and simultaneously move outwardly a distance sufficient to clear said edge of said lift chamber.

4. In combination with an air-cushion vehicle having a lift chamber, means for providing pressurized air in said lift chamber, and a generally rigid structure having a lateral surface extending along an edge of said lift chamber, a skirt arrangement for said lift chamber comprising a flexible diaphragm disposed longitudinally of said edge so as to present one side of said diaphragm adjacent said lift chamber, one longitudinal edge of said diaphragm being attached to said vehicle adjacent said edge of said lift chamber, a plate means, said plate means including an edge connected to the lower edge of said dipahragm, said plate means being inclined downwardly from said edge thereof to a portion thereof which is beneath said lateral surface, means for applying pressurized air to the upper surface of said plate means and to said side of said flexible diaphragm, means interconnecting said plate means and said vehicle, and means for moving said skirt arrangement downwardly relative to said lateral surface, said means for moving said skirt arrangement downwardly including movable means carried by said rigid structure at said edge of said lift chamber, said one longitudinal edge of said diaphragm being secured to said movable means, whereby movement of said movable means moves said diaphragm therewith, said movable means including a generally horizontal member having an inner edge and an outer edge, and means pivotally attaching said inner edge to said rigid structure so as to position said generally horizontal member adjacent said lateral surface with said outer edge adjacent said edge of said lift chamber, said one longitudinal edge of said diaphragm being attached to said outer edge of said generally horizontal member, said generally horizontal member having an opening means therethrough providing communication between said lift chamber and the space between said generally horizontal member and said lateral surface of said rigid structure.

5. A device as recited in claim 4 including means for discharging air from said space laterally with respect to said vehicle upon predetermined downward movement of said generally horizontal member, for thereby imposing a side thrust on said vehicle.

6. A device as recited in claim 5 in which for said means for discharging air from said space laterally said generally horizontal member includes an upstanding flange on said outer edge thereof, said upstanding flange being normally in sealing relationship with said edge of said lift chamber, said upstanding flange being moved to a position where it is spaced downwardly from said edge of said lift chamber upon said predetermined downward movement of said generally horizontal member.

7. A device as recited in claim 4 including in addition a second diaphragm interconnecting said outer edge of said generally horizontal member and said edge of said lift chamber for substantially preventing lateral discharge of air from said space upon downward movement of said generally horizontal member.

8. A device as recited in claim 7 in which said opening means provides restricted communication between said lift chamber and said space, whereby air is substantially retained in said space and provides a springlike action and a damping effect upon oscillation of said generally horizontal member.

9. In combination with an air-cushion vehicle having a lift chamber having an open bottom, means for providing pressurized air in said lift chamber, and a generally rigid structure having a lateral surface spaced outwardly from the center of said lift chamber and extending along an edge of said lift chamber, a skirt arrangment for said lift chamber comprising a flexible diaphragm disposed longitudinally of said edge so as to present one side of said diaphragm adjacent said lift chamber,
one longitudinal edge of said diaphragm being attached to said vehicle adjacent said edge of said lift chamber,
a plate means,
said plate means including an outer edge connected to the lower edge of said diaphragm,
said plate means being inclined downwardly from said outer edge thereof to a portion thereof which is beneath said lateral surface,
said plate means including an inner edge spaced outwardly from the center of said lift chamber and adjacent said lateral surface for permitting air to flow from said lift chamber generally horizontally outwardly under said plate means to the exterior of said lift chamber,
said plate means including a first downwardly and inwardly inclined portion, and a second generally flat horizontal portion connected to the lower edge of said first portion at an obtuse angle relative thereto and extending inwardly therefrom to said inner edge of said plate, for being reacted upon by pressures above and below said second portion for moving said skirt arrangement upwardly and downwardly,
means for applying pressurized air to the upper surface of said plate means and to said side of said flexible diaphragm, and
flexible means interconnecting said plate means and said vehicle,
said plate means being a flexible sheet member, said means interconnecting said plate means and said vehicle including flexible elements attached to said first portion and to said second portion of said plate means for generally maintaining the shape of said plate means when said plate means is so subjected to pressure from pressurized air in said lift chamber.

10. In combination with an air-cushion vehicle having a lift chamber having an open bottom, means for providing pressurized air in said lift chamber, and a generally rigid structure having a lateral surface spaced outwardly from the center of said lift chamber and extending along an edge of said lift chamber at the rearward end thereof, a skirt arrangement for said lift chamber comprising a flexible diaphragm disposed longitudinally of said edge so as to present one side of said diaphragm adjacent said lift chamber,
one longitudinal edge of said diaphragm being attached to said vehicle adjacent said edge of said lift chamber,
a plate means,
said plate means including an outer edge connected to the lower edge of said diaphragm,
said plate means being included downwardly from said outer edge thereof to a portion thereof which is beneath said lateral surface,
said plate means including an inner edge spaced outwardly from the center of said lift chamber and adjacent said lateral surface for permitting air to flow from said lift chamber generally horizontally outwardly under said plate means to the exterior of said lift chamber,
said plate means being a substantially rigid member curved to form a shallow channel with a convex surface facing downwardly,
said diaphragm being inclined downwardly and forwardly relative to said vehicle from said attachment thereof adjacent said edge of said lift chamber to said connection thereof to said plate means,
means for applying pressurized air to the upper surface of said plate means and to said side of said flexible diaphragm,
and flexible means interconnecting said plate means and said vehicle.

11. A device as recited in claim 10 including in addition means for varying the dimension of said diaphragm for raising and lowering said plate means.

12. A device as recited in claim 11 in which said means for varying the dimension of said diaphragm includes a rotatable spool on said vehicle, said one longitudinal edge of said diaphragm being attached to said spool.

13. A device as recited in claim 10 in which said substantially rigid member includes a portion inclined upwardly and forwardly relative to said vehicle to an opposite edge thereof.

14. A device as recited in claim 10 in which
said means interconnecting said plate means and said vehicle includes a diaphragm inclined upwardly and forwardly from the forward edge of said substantially rigid member to said lateral surface,
and including in addition a conduit means providing communication between said lift chamber and the interior of said skirt arrangement, whereby pressurized air from said lift chamber inflates said skirt arrangement.

15. In combination with an air-cushion vehicle having a lift chamber having an open bottom, means for providing pressurized air in said lift chamber, and a generally rigid structure having a lateral surface spaced outwardly from the center of said lift chamber and extending along an edge of said lift chamber, a skirt arrangement for said lift chamber comprising a flexible diaphragm disposed longitudinally of said edge so as to present one side of said diaphragm adjacent said lift chamber, one longitudinal edge of said diaphragm being attached to said vehicle adjacent said edge of said lift chamber, a plate means, said plate means including an outer edge connected to the lower edge of said diaphragm, said plate means being inclined downwardly from said outer edge thereof to a portion thereof which is beneath said lateral surface, said plate means including an inner edge spaced outwardly from the center of said lift chamber and adjacent said lateral surface for permitting air to flow from said lift chamber generally horizontally outwardly under said plate means to the exterior of said lift chamber, said plate means including a first downwardly and inwardly inclined portion, and a second generally flat horizontal portion connected to the lower edge of said first portion at an obtuse angle relative thereto and extending inwardly therefrom to said inner edge of said plate, for being reacted upon by pressures above and below said second portion for moving said skirt arrangement upwardly and downwardly, aperture means in said generally horizontal portion of said plate means for discharging air from said skirt arrangement in a generally downward direction adjacent said second portion and constricting the outward generally horizontal flow of air from said lift chamber under said skirt arrangement, said aperture means including a duality of elongated slots, the first of said slots being adjacent the outer edge of said second portion and being inclined downwardly and inwardly for discharging a jet of air downwardly and inwardly therefrom, the second of said slots being inwardly of said first slot and being substantially vertically oriented for discharging a jet of air vertically downwardly therefrom, means for applying pressurized air to the upper surface of said plate means and to said side of said flexible diaphragm, and flexible means interconnecting said plate means and said vehicle.

16. In combination with an air-cushion vehicle having a lift chamber having an open bottom, means for providing pressurized air in said lift chamber, and a generally rigid structure having a lateral surface spaced outwardly from the center of said lift chamber and extending along an edge of said lift chamber, a skirt arrangement for said lift chamber comprising a plurality of skirt units substantially in end-to-end alignment along said edge of said lift chamber, with the ends of adjacent skirt units being in juxtaposition, said skirt units being unconnected to each other so as to be independently movable, each of said skirt units including a flexible diaphragm disposed longitudinally of said edge so as to present one side of said diaphragm adjacent said lift chamber, one longitudinal edge of said diaphragm being attached to said vehicle adjacent said edge of said lift chamber, a plate means, said plate means including an outer edge connected to the lower edge of said diaphragm, said plate means being inclined downwardly from said outer edge thereof to a portion thereof which is beneath said lateral surface, said plate means including an inner edge spaced outwardly from the center of said lift chamber and adjacent said lateral surface for permitting air to flow from said lift chamber generally horizontally outwardly under said plate means to the exterior of said lift chamber, means for applying pressurized air to the upper surface of said plate means and to said side of said flexible diaphragm, flexible means interconnecting said plate means and said vehicle, and an additional flexible diaphragm at either end of said skirt unit positioned at the ends of said first-mentioned diaphragm and the ends of said plate means, said additional flexible diaphragms covering less than the entire space at the ends of said skirt unit for allowing air to flow from one of said skirt units to the other.

17. In combination with an air-cushion vehicle having a lift chamber, means for providing pressurized air in said lift chamber, and a generally rigid structure having a lateral surface extending along an edge of said lift chamber, a skirt arrangement for said lift chamber comprising:

a flexible diaphragm disposed longitudinally of said edge so as to present one side of said diaphragm adjacent said lift chamber, one longitudinal edge of said diaphragm being attached to said vehicle adjacent said edge of said lift chamber, a plate means, said plate means including an edge connected to the lower edge of said diaphragm, a first portion extending downwardly and inwardly from said edge thereof with respect to said lift chamber, a second generally horizontal portion beneath said lateral surface connected to the lower edge of said first portion at an obtuse angle relative thereto and extending inwardly therefrom with respect to said lift chamber, and a third portion connected to the inner edge of said first portion and extending upwardly and inwardly therefrom with respect to said lift chamber, said plate means including a duality of elongated slots, the first of said slots extending longitudinally of said plate means substantially at the connection between said first and second portions thereof, the second of said slots extending longitudinally of said plate means substantially at the connection between said second and third portions thereof, said second portion of said plate means being connected to said third portion of said plate means so as to be pivotal relative to said third portion of said plate means substantially about an axis extending generally along the line of connection between said second and third portions, said first slot being defined on one side thereof by the outer edge of said second portion of said plate means, means for so pivoting said second portion relative to said third portion for increasing the size of said first slot, means for applying pressurized air to the upper surface of said plate means and to said side of said flexible diaphragm, and means interconnecting said plate means and said vehicle, said means interconnecting said plate means and said vehicle being a second diaphragm, said second diaphragm extending from said portion of said plate means to said generally rigid structure, said second diaphragm being connected to the inner edge of said third portion of said plate means.

18. A device as recited in claim 17 in which for said connection of said second portion to said third portion there are relatively narrow deflectable strips of said plate means extending transversely across said second slot between said second and third portions of said plate means.

19. A device as recited in claim 18 in which said first slot is inclined downwardly and inwardly relative to said vehicle, and said second slot is substantially vertical.

20. In combination with an air-cushion vehicle having a lift chamber having an open bottom, means for providing pressurized air in said lift chamber, and a generally rigid structure having a lateral surface spaced outwardly from the center of said lift chamber and extending along an edge of said lift chamber, a skirt arrangement for said lift chamber comprising a flexible diaphragm disposed longitudinally of said edge so as to present one side of said diaphragm adjacent said lift chamber, one longitudinal edge of said diaphragm being attached to said vehicle adjacent said edge of said lift chamber, a plate means, said plate means including an outer edge connected to the lower edge of said diaphragm, said plate means being inclined downwardly from said outer edge thereof to a portion thereof which is beneath said lateral surface, said plate means including an inner edge spaced outwardly from the center of said lift chamber and adjacent said lateral surface for permitting air to flow from said lift chamber generally horizontally outwardly under said plate means to the exterior of said lift chamber, means for applying pressurized air to the upper surface of said plate means and to said side of said flexible diaphragm, flexible means interconnecting said plate means and said vehicle, said flexible means being a second diaphragm extending from said portion of said plate means to said generally rigid structure, said plate means including a first portion extending downwardly and inwardly with respect to said lift chamber, a second generally horizontal portion connected to the lower edge of said first portion at an obtuse angle relative thereto and extending inwardly therefrom with respect to said lift chamber, and a third portion connected to the inner edge of said first portion and extending upwardly and inwardly therefrom with respect to said lift chamber to said inner edge of said plate means, said second diaphragm being connected to the inner edge of said third portion of said plate means, said plate means including a duality of elongated slots, the first of said slots extending longitudinally of said plate means substantially at the connection between said second and third portions thereof, said second portion of said plate means being connected to said first portion of said plate means so as to be pivotal relative to said first portion of said plate means substantially about an axis extending generally along the line of connection between said first and second portions, said second slot being defined on one side thereof by the inner edge of said second portion of said plate means, and means for so pivoting said second portion relative to said first portion for increasing the size of said second slot.

21. A device as recited in claim 20 in which for said connection of said second portion to said first portion there are relatively narrow deflectable strips of said plate means extending transversely across said first slot between said first and second portions of said plate means.

22. A device as recited in claim 21 in which said second slot is inclined downwardly and inwardly relative to said vehicle, and said second slot is substantially vertical.

* * * * *